United States Patent [19]

Maeda et al.

[11] Patent Number: 5,640,264
[45] Date of Patent: Jun. 17, 1997

[54] SCANNING DEVICE

[75] Inventors: Eisaku Maeda, Sakura; Nobuhiro Fujinawa, Yokohama, both of Japan

[73] Assignee: Nikon Corporation, Tokyo, Japan

[21] Appl. No.: 507,963

[22] Filed: Jul. 27, 1995

Related U.S. Application Data

[60] Continuation of Ser. No. 339,217, Nov. 10, 1994, abandoned, which is a division of Ser. No. 70,801, Jun. 3, 1993, Pat. No. 5,420,712.

[30] Foreign Application Priority Data

Jun. 10, 1992 [JP] Japan ............................ 4-150651

[51] Int. Cl.$^6$ ................................................ G02B 26/08
[52] U.S. Cl. .......................... 359/204; 359/196; 359/634; 362/293
[58] Field of Search .............................. 359/196, 204, 359/205–208, 359, 634, 618, 629, 589; 250/208.3, 227.28, 329–330, 453.11; 346/108, 160; 358/296, 486, 494, 498; 362/293, 296–298, 800; 347/232, 233, 238

[56] References Cited

U.S. PATENT DOCUMENTS 5,177,605  1/1993  Takahashi et al. ..................... 358/98

FOREIGN PATENT DOCUMENTS 0452759  10/1991  European Pat. Off. ..

Primary Examiner—James Phan
Attorney, Agent, or Firm—Shapiro and Shapiro

[57] ABSTRACT

A scanning device for scanning an original which is set at a predetermined position and has information recorded thereon comprises: a plurality of light emission members for emitting lights of different wavelengths from each other; a first reflection member having a plurality of reflection planes for selectively reflecting emitted lights of a plurality of wavelengths coming from the light emission members and an optical aid portion; a second reflection member for reflecting the lights reflected by the first reflection member to focus them on the original in a linear pattern; and an imaging optical system for focusing the lights of the linear pattern onto a sensor, whereby the sensor receives the information of the original. The device has depressions arranged around the light emission members for reflecting lights and the depressions are shaped differently depending on increased wavelengths of the light emissions of the corresponding light emission members so that the light intensities of the respective wavelengths of light emissions and decreased non-uniformity of the light intensity are attained.

9 Claims, 3 Drawing Sheets

5,640,264

SCANNING DEVICE

This is a continuation of application Ser. No. 08/339,217 filed Nov. 10, 1994, now abandoned, which is a division of application Ser. No. 08/070,801 filed Jun. 3, 1993 (now U.S. Pat. No. 5,420,712).

BACKGROUND OF THE INVENTION

1. Field of the Invention

The present invention relates to a scanning device for scanning an image recorded on a film.

2. Related Background Art

In order to read a recorded color image, each of the red, green and blue images must be read. In order to reduce a size of this type of device, it has been proposed to use a plurality of LED's for red, green and blue as illumination sources. However, because the presently available LED has a big difference in intensity depending on the color of light emission, the number of LED's used is varied depending on the color of light emission.

Since the light intensity of the LED is very small depending on the color of light emission and the number of LED's used is limited in order to reduce the size of the device, it is necessary to efficiently operate the LED's.

Further, since a limited number of LED's are used depending on the color of light emission, non-uniformity of illumination occurs. Accordingly, it is necessary to eliminate a component of a light source which adversely affects the image quality.

SUMMARY OF THE INVENTION

The scanning device of the present invention scans an original which is set at a predetermined position and has information recorded thereon. The present scanning device comprises: a plurality of light emission members for emitting lights of different wavelengths from each other; a first reflection member having a plurality of reflection planes for selectively reflecting lights of a plurality of wavelengths coming from by the light emission members and optical aid means, a second reflection member for reflecting the light reflected by the first reflection member to focus it on the original in a linear pattern; and focusing means (an imaging optical system) for focusing the information of the original onto a sensor in accordance with the reflected light from the second reflection member.

The device has depressions arranged around the light emission members for reflecting lights and the depressions are shaped differently depending on the wavelengths of the light emissions of the corresponding light emission members so that increased light intensities of the respective wavelengths of light emissions and the decrease of non-uniformity of the light intensity are attained.

In the present device, the light intensity on the original increases when optical distances from the respective light emission members to the original are equal.

In the present device, the position adjustment of the sensor is facilitated by arranging the original slightly off the focal point of the light focused by the second reflection member so that the non-uniformity of the light intensity of the light illuminating the original is reduced.

In the present device, when the focusing means is a lens and the light projected by the second reflection member is converged such that the information light from the original does not fill an aperture of the lens, flare is prevented and a high contrast image is produced.

In the present device, infrared light which adversely affects performance may be eliminated by reflecting only a visible light or a light of only a waveform necessary for scanning.

In the present device, the light intensity on a center axis of a line of a plurality of light emission members is increased by arranging the light emission members in a line and arranging them such that a maximum light intensity of the light emission members is arranged around the center axis of the line.

In the present device, the leakage of the reflected light is prevented by providing focusing means for focusing the reflected light from the first reflection member to the second reflection member.

In the present device, a high efficiency is attained by arranging the light emission members in a line and arranging the light emission members such that a maximum light intensity of the light emission members is arranged around the center axis of the line. Where LED's of generally square shape are used as the light emission members, it is preferable that the LED's are arranged such that one side of the square is inclined from the axis of the line by approximately 30 degrees.

In another aspect, the present invention relates to a light projection device for a scanning device for scanning an original having information recorded thereon. The device comprises a plurality of light emission members for emitting lights of different wavelengths from each other, and optical aid means arranged around the light emission members for focusing the lights of different wavelengths emitted by the plurality of light emission members. The light emission members are arranged in a line and also arranged such that a maximum light intensity of the light emission members is arranged around the center axis of the line. The optical aid means have different shapes depending on the wavelengths of the lights emitted by the corresponding light emission members. Where the LED's of generally square shape are used as the light emission members, the LED's are arranged such that one side of the square is inclined from the axis of the line by approximately 30 degrees.

DETAILED DESCRIPTION OF THE PREFERRED EMBODIMENTS

Figure 1:
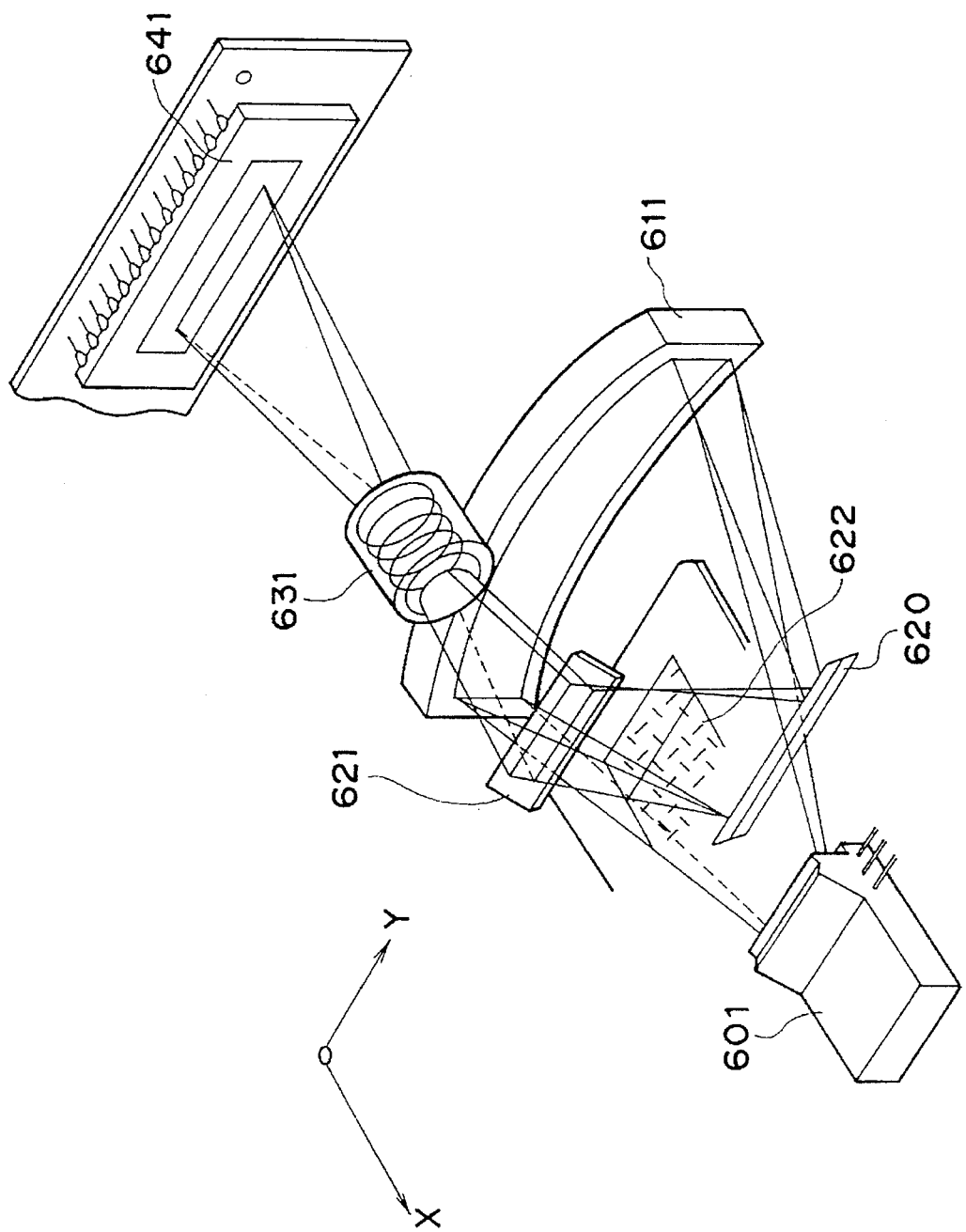
FIG. 1 shows a device for forming an image in one embodiment of the present invention.

FIG. 1 shows a device for forming an image in one embodiment of the present invention.

In FIG. 1, the device comprises a light source 601, a concave mirror 611, a mirror 620, a mirror 621, an image forming lens 631 and a sensor 641.

The light source 601 uses LED chips of three colors as a light emission source.

The concave mirror 611 is of toroidal design, that is, it is a mirror having curvatures of two different axes for linearly focusing the light from the light source 601 onto a plane of a film 622.

The mirror 620 reflects the light reflected by the concave mirror 611 to direct it to the plane of the film 622.

The mirror 621 reflects the light transmitted through the film 622 to the image forming lens 631.

The image forming lens 631 focuses the reflected light from the mirror 621 onto the sensor 641.

The sensor 641 is a CCD which converts the light focused by the image forming lens 631 to an electrical signal.

The film 622 may be a negative film or a positive film having light transparency.

Figure 2A:
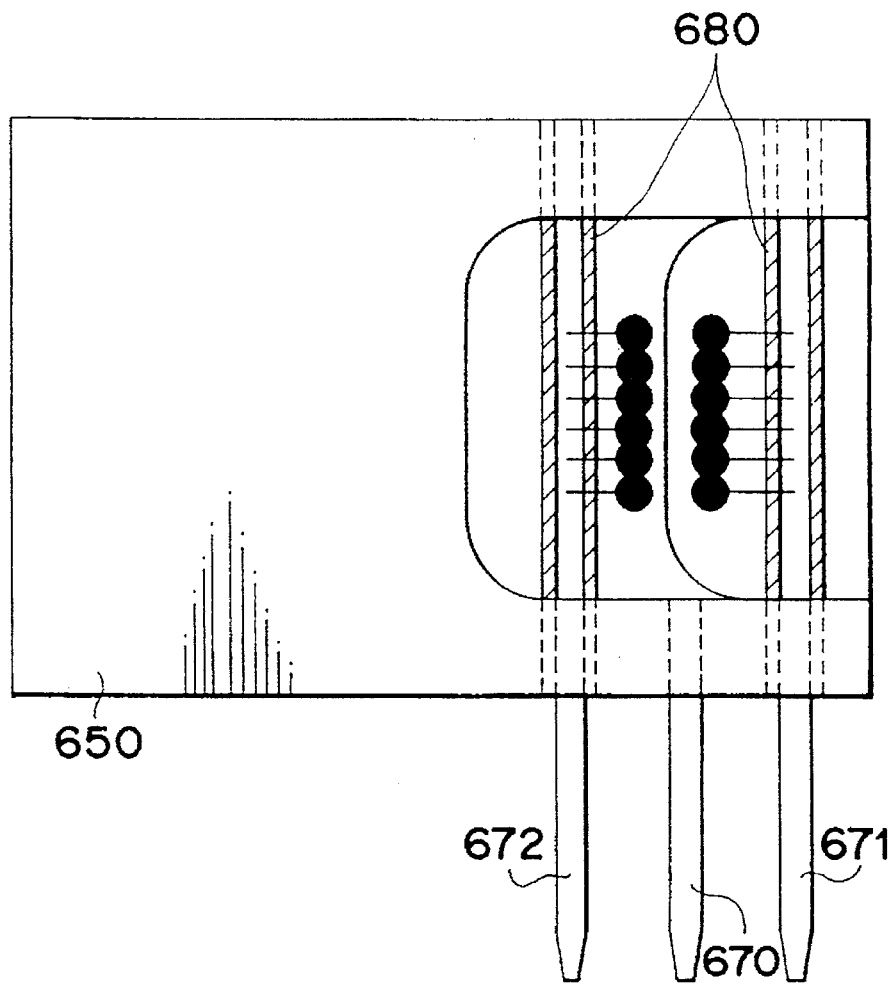
FIGS. 2A and 2B show detail of a light source 601 in FIG. 1.
Figure 2B:
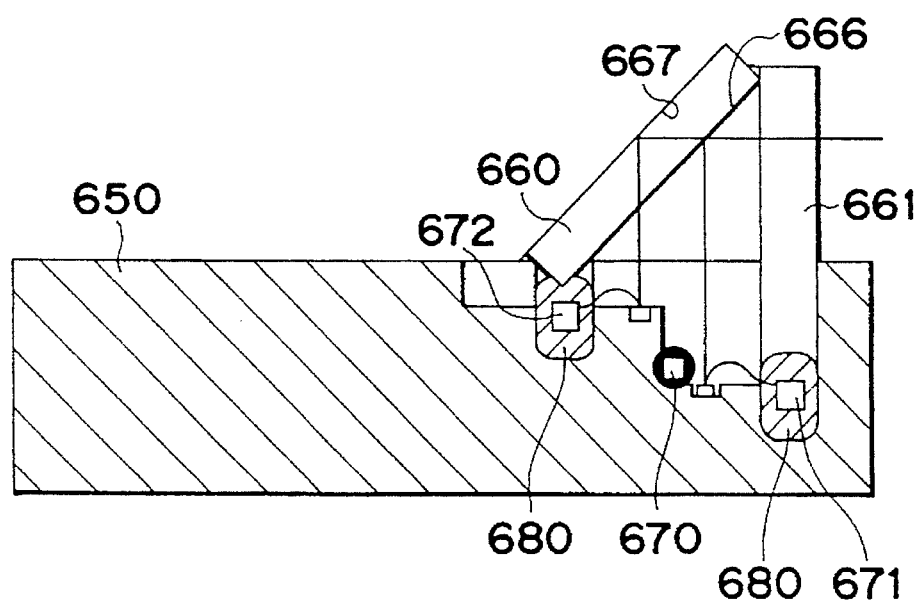

FIGS. 2A and 2B show detail of the light source 601 of FIG. 1.

In FIGS. 2A and 2B, the light source 601 comprises two red LED chips, four green LED chips, six blue LED chips, a support table 650, a dichroic mirror 660, an infrared blocking filter 661, a common lead 670, a blue lead 671, a red-green lead 672 and an insulator 680.

The red LED chip uses GaAlAs (gallium aluminum arsenide) as a material and has a cathode electrode on a top light emission plane and an anode electrode on a bottom surface. The green LED chip uses GaP/GaP (gallium phosphor/gallium phosphor) as a material and has an anode electrode on a top light emission plane and a cathode electrode on a bottom plane. The blue LED chip uses SiC (silicon carbide) as a material and has an anode electrode on a top light emission plane and a cathode electrode on a bottom plane. They generate lights of red, green and blue, respectively.

Six LED chips are arranged on the support table 650 in two lines, namely, the red LED chips and the green LED chips in one line and the blue LED chips in one line. In the line of the red and green LED chips, they are arranged in the order of green, red, green, green, red and green. They are arranged by taking the non-uniformity of illumination due to the difference in numbers into consideration, although the present invention is not limited thereto and further improvement may be attained by changing the distances between the LED chips.

The numbers of LED chips of different colors used are different because of a substantial difference between light emission intensities per chip of the presently available LED chips of various colors. However, since the illumination light intensity may not be made uniform by merely changing the numbers of chips, the light emission times of the LED chips of the respective colors may be adjusted when the image is read.

The respective LED chips are arranged such that the optical distances from the light emission surfaces of the respective LED chips to the exit planes are equal. As a result, the lights of all colors are focused on the film 622.

The support table 650 is made of a conductive material.

The common lead 670 is electrically connected to the support table 650 and the blue lead 671 and the red-green lead 672 are insulated from the support table 650.

The common lead 670 is connected to the anodes of the red LED chips, the cathodes of the green LED chips and the cathodes of the blue LED chips through the support table 650.

The blue lead 671 is insulated from the support table 650 by an insulator 680, and wire-bonded to the anodes of the blue LED chips.

The red-green lead 672 is insulated from the support table by the insulator 680 and wire-bonded to the cathodes of the red LED chips and the anodes of the green LED chips.

It is necessary to arrange the red LED chips and the green LED chips which use the common lead, in the opposite polarities so that the red, green and blue LED chips can independently emit lights. Since the red LED chip and the green LED chip used in the present embodiment are of opposite polarities as described above, a vertical arrangement for all LED chips may be used.

The dichroic mirror 660 comprises a dichroic plane 666 and an aluminum plane 667 coated by an aluminum layer. The blue light emitted from the blue LED chip is reflected by the dichroic plane 666, and the red and green lights emitted from the red and green LED chips pass through the dichroic plane 666 and are reflected by the aluminum plane 667. Those reflected lights pass through the same light path on an exit plane.

The blue LED chip which uses SiC as the material emits not only the blue light but also a small quantity of green light. Since a blue reflection film for selectively reflecting only the blue light is applied to the dichroic plane 666 of the dichroic mirror 660, the green light from the blue LED chip is not reflected. However, the aluminum plane 667 reflects the green light emitted by the blue LED chip. This will deteriorate the image quality. Thus, the dichroic mirror 660 is arranged in such a manner that a strong light around the axis of the line of the blue LED chips is reflected by the aluminum plane 667 and does not go out of the exit plane. A weak light which goes out of the exit plane is weak by itself and defocused on the film 622 so that it does not significantly affect the image quality.

The infrared blocking filter 661 is provided on the exit plane of the light source 601 and it prevents the degradation of the image quality by the infrared component included in the red LED light. The infrared blocking filter 661 is not necessary when the aluminum plane 667 of the dichroic mirror 660 is a reflection plane which reflects only a visible light. The color reproducibility may be improved by forming a reflection film which reflects only a desired wavelength.

Where the exit plane of the light source 601 is cylindrical or toroidal, the illumination light is focused and a larger amount of light may be reflected from the concave mirror 611.

The dichroic mirror 660, the LED chips and the infrared blocking filter 661 are integrally assembled by epoxy which is an optical material.

Figure 3:
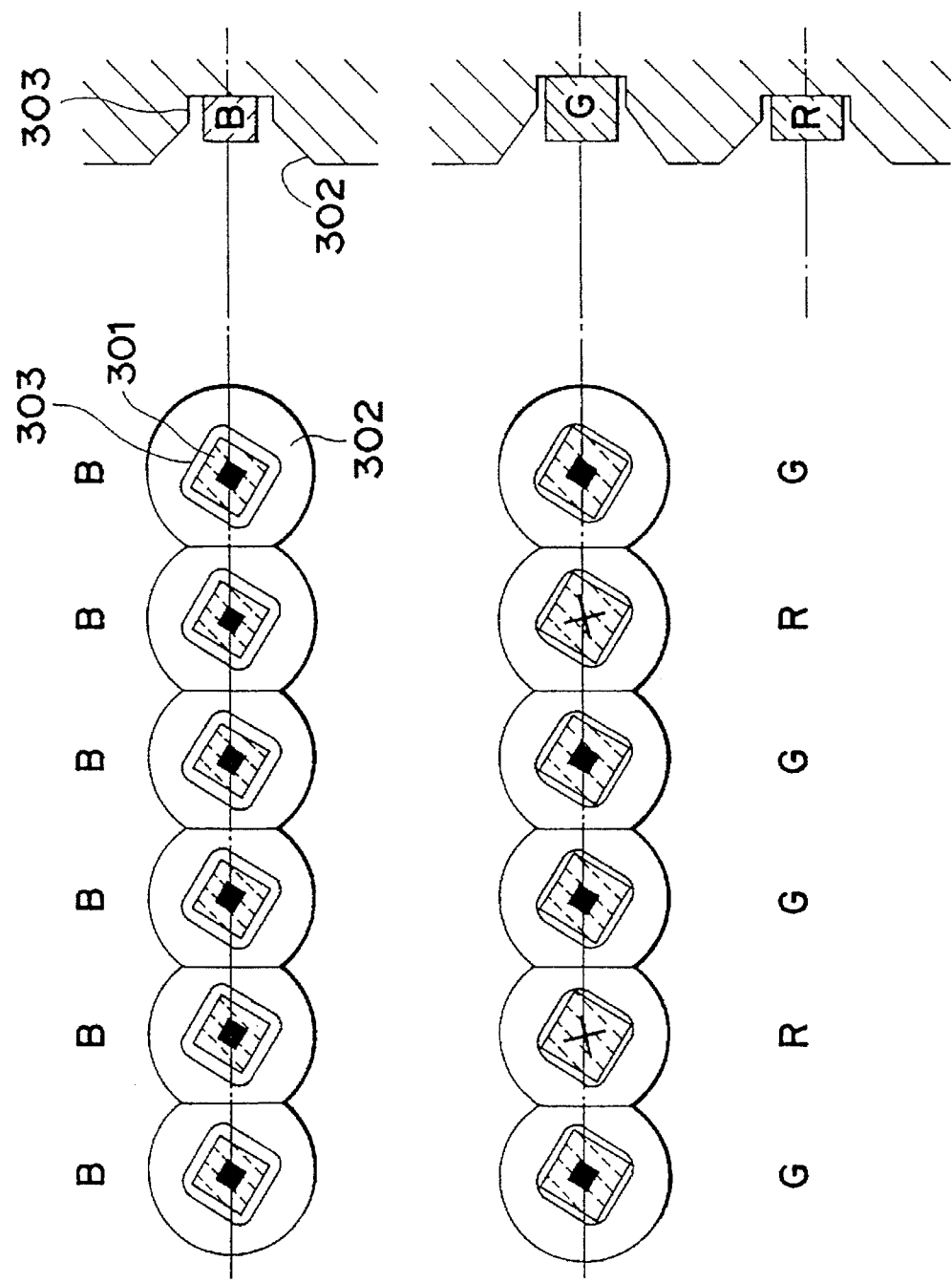
FIG. 3 shows a line arrangement of LED chips and a light emission member 301 of the LED chip and a depressions 302 and 303.

FIG. 3 shows a line arrangement of the LED chips and the light emission portion 301 of the LED chip and the depressions 302 and 303.

In FIG. 3, each of the LED chips has the light emission portion 301 of generally square shape when viewed from the top and is arranged such that the light emission portion 301 of the LED chip is inclined around the center thereof to the line axis by about 30 degrees.

Since the LED chip has a property of emitting strong lights from four corners of the square, it is arranged such that the four corners are not away from the center axis of the line to increase the light intensity around the center axis of the LED chips.

The depressions 302 and 303 have silver plating or rhodium or gold plating applied to the surfaces thereof to efficiently direct the lights from the LED chips. Since the number and the shape of the LED chips, the position of the light emission portion 301 and the transparency of the chip varies from color to color, the height, the inclination angle and the curvature of the slope are different. The spread of undesired light can be suppressed by forming the slope as elliptic or parabolic.

When the depression 302 is elliptic having a major axis along the line axis of the LED chips when viewed from the top, the light intensity around the axis of the LED chip line is increased.

The non-uniformity of the illumination can be reduced for the red LED chips which are used in a small number by increasing the major axis of the ellipse of the depression 302.

A light path is briefly explained by referring to FIG. 1.

The light source 601 emits one of the red, green and blue lights.

The light is reflected by the concave mirror 611 and the mirror 620 and a light focused in line pattern is irradiated to the plane of the film 622. A maximum light intensity is attained by focusing onto the film 622.

The light transmitted through the film 622 is reflected by the mirror 621 and directed to the image forming lens 631.

If the illumination light totally illuminates a lens, flare may take place. In order to attain an image of a higher contrast, the illumination light is converged so as to fill 70 percent of the lens aperture. This may be attained by spacing the optical distance of the image forming lens 631 from the film 622.

The line image formed by the image forming lens 631 on the sensor 641 is converted to an electrical signal by the sensor 641.

The red, green and blue lights are illuminated to one line of the film 622 and the film 622 is moved to the next read line along the X axis by a drive unit, not shown, and the same process is repeated for that line.

A plurality of line information supplied from the sensor 641 are processed by a control unit, not shown, and supplied to a monitor.

A second embodiment of the present invention is now explained.

In the present embodiment, the optical distance from the light source 601 to the film 622 is slightly shifted.

As a result, the light is not focused on the plane of the film 622 so that the line illumination light on the film 622 has a width (which is less than 1 mm in order not to decrease the illumination light intensity more than required) and the line image formed on the sensor 641 also has a width.

As a result, the positioning for focusing on the sensor 641 is facilitated. Further, fine positioning of the film 622 is not necessary. Further, since the illumination light is defocused, the non-uniformity of the illumination is reduced.

In a third embodiment of the present invention, the red LED chips which are used in a small number in the first embodiment are arranged slightly closer to the dichroic mirror 660. As a result, the red light is not focused on the film 622 and the line red illumination light on the film 622 has a width so that the line image formed on the sensor 641 also has a width.

As a result, the positioning of the sensor 641 is facilitated by using the red light. Further, since the defocusing reduces the non-uniformity of the illumination, it is preferable to shift the red LED chips which are small in number and have a relatively large non-uniformity of the illumination.

While the red LED chips are arranged to be slightly closer to the dichroic mirror 660 in order to defocus the light in the present embodiment, they may be arranged further therefrom to obtain the defocusing. However, they are arranged to be closer in the present embodiment in order to prevent the light intensity from being reduced.

Since the light intensity decreases when the light is defocused, the positions of the LED chips which have high illumination light intensity may be shifted. In the present embodiment, the red LED chips correspond to such LED chips.

In the above embodiments, the light is transmitted through the recording medium such as the film. Alternatively, the present invention is applicable to a device which reflects the information of the recording medium to read it.

Since the optical aid means is provided in the present invention, the light from the light emission member can efficiently directed.

By making the optical distances from the light emission members to the recording medium equal, the light intensity on the recording member increases.

By focusing the light slightly off the recording medium, the positioning of the sensor is facilitated and the non-uniformity of the light intensity of the light illuminating the recording medium is eliminated.

By converging the light such that the lens aperture is not filled, flare is prevented and a light image of a high contrast is attained.

By providing the reflective depressions which are different depending on the wavelength of the light emission are provided, the light intensities are increased and the non-uniformity of the light intensity is reduced for the respective wavelengths of light emission.

By providing a first reflection member that reflects only the visible light or a light of only a desired wavelength, no adverse affect to the information is produced and the infrared ray is not reflected.

By disposing the LED chips so that they are inclined approximately 30 degrees to arrange the four corners around the center axis in order to bring the maximum light emission portion of the light emission member around the center axis of the light emission member, the light intensity on the center axis of the line increases.

By providing focusing means for focusing the reflected light from the first reflection member to the second reflection member, the leakage of the reflected light is prevented.

What is claimed is:

1. A light source device for a scanner which illuminates an original to read an image of the original, said light source device comprising:
   a plurality of light emission members mounted on a base for emitting respective lights of different wavelengths from each other;
   a dichroic mirror mounted on said base and having a dichroic plane and a reflection plane disposed such that light of one of said wavelengths is reflected by said dichroic plane and light of another of said wavelengths is transmitted by said dichroic plane and reflected by said reflection plane back through said dichroic plane so as to leave the dichroic mirror with a same axis as the light of said one wavelength; and
   an infrared blocking portion mounted on said base to exclude infrared rays from the light leaving said dichroic mirror.

2. A light source device according to claim 1, wherein said infrared blocking portion comprises a surface that does not reflect infrared light and that is provided at one of said planes of said dichroic mirror.

3. A light source device according to claim 1, wherein said infrared blocking portion comprises an infrared blocking filter disposed in front of said dichroic plane of said dichroic mirror.

4. A light source device according to claim 3, wherein said dichroic mirror is disposed with a predetermined inclination relative to a surface of said base, and said infrared blocking filter has a surface arranged substantially at a right angle to said surface of said base.

5. A light source device for a scanner which illuminates an original to read an image of the original, said light source device comprising:

a plurality of first light emitting members linearly arranged on a base and which emit light of a first wavelength;

a plurality of second light emitting members linearly arranged on said base substantially parallel to said first light emitting members and which emit light of at least a second wavelength different from said first wavelength;

a dichroic mirror mounted on said base and having a dichroic plane and a reflection plane disposed such that the light of said first wavelength is reflected by said dichroic plane and the light of said second wavelength is transmitted by said dichroic plane and reflected by said reflection plane back through said dichroic plane so as to leave said dichroic mirror with a same axis as the light of said first wavelength; and an infrared blocking portion mounted on said base to exclude infrared rays from the light leaving said dichroic mirror.

6. A light source device according to claim 5, wherein said second light emitting members include light emitting members which emit light of a third wavelength different from said first and second wavelengths, and the light of said third wavelength is transmitted by said dichroic plane and reflected by said reflection plane back through said dichroic plane so as to leave said dichroic mirror with a same axis as the light of said first wavelength and the light of said second wavelength.

7. A light source device according to claim 5, wherein said infrared blocking portion comprises a surface that does not reflect infrared light and that is provided at said dichroic plane of said dichroic mirror.

8. A light source device according to claim 5, wherein said infrared blocking portion comprises an infrared blocking filter disposed in front of said dichroic plane of said first reflection member.

9. A light source device according to claim 5, wherein said dichroic mirror is disposed with a predetermined inclination relative to a surface of said base, and said infrared blocking portion includes an infrared blocking filter disposed on said base and having a surface substantially at a right angle to said surface of said base.

* * * * *